No. 614,761. Patented Nov. 22, 1898.
J. W. RIGG.
PULVERIZER.
(Application filed Mar. 22, 1898.)
(No Model.)
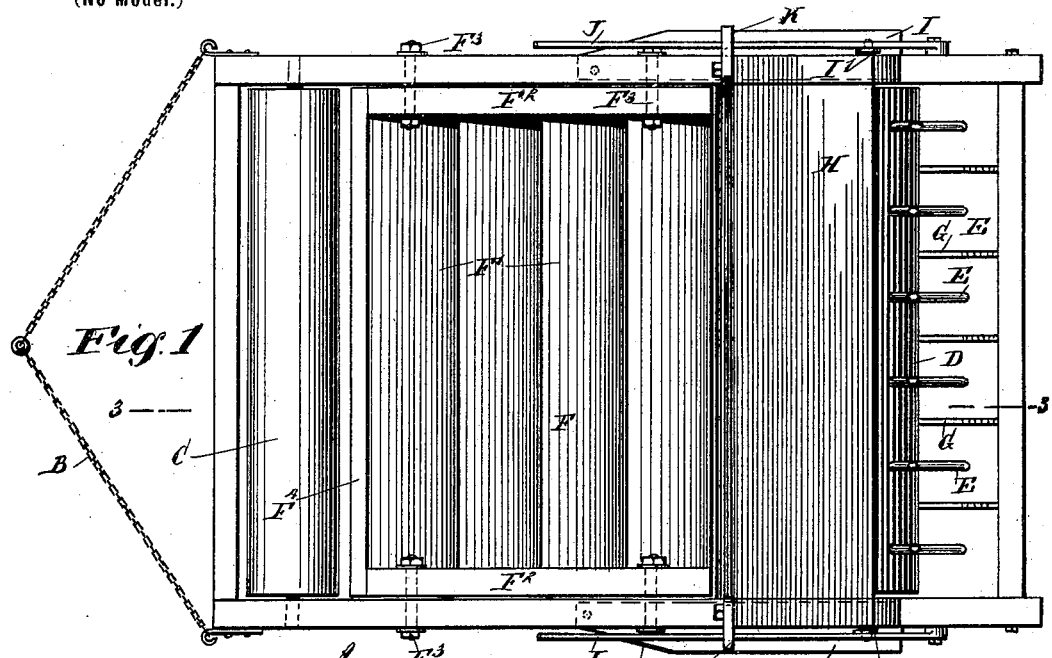
Fig. 1
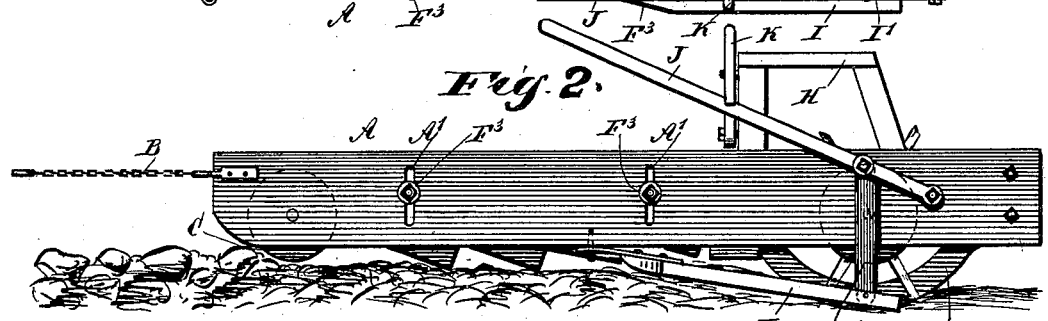
Fig. 2
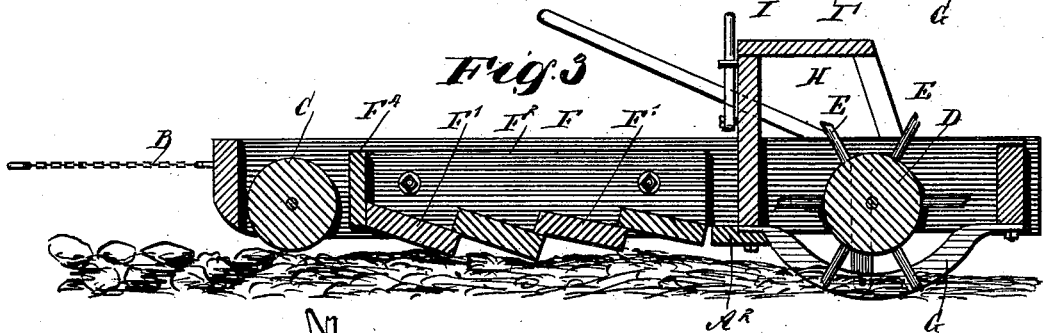
Fig. 3
Fig. 4
WITNESSES:
INVENTOR
J. W. Rigg
ATTORNEYS.

UNITED STATES PATENT OFFICE.

JAMES W. RIGG, OF MOUNT CARMEL, ILLINOIS.

PULVERIZER.

SPECIFICATION forming part of Letters Patent No. 614,761, dated November 22, 1898.

Application filed March 22, 1898. Serial No. 674,770. (No model.)

*To all whom it may concern:*

Be it known that I, JAMES W. RIGG, of Mount Carmel, in the county of Wabash and State of Illinois, have invented new and useful Improvements in Pulverizers, of which the following is a full, clear, and exact description.

The invention relates to agricultural implements; and its object is to provide a new and improved pulverizer which is simple and durable in construction, very effective in breaking clods, leveling the ground, and in a general way preparing the ground to receive the seed.

The invention consists principally of a front roller, a spiked rear roller, and a drag intermediate of the said rollers.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in the several views.

Figure 1 is a plan view of the improvement. Fig. 2 is a side elevation of the same. Fig. 3 is a sectional side elevation of the same on the line 3 3 of Fig. 1, and Fig. 4 is a rear end elevation of the same.

The improved machine is provided with a suitably-constructed frame A, provided at its front end with a chain B, arranged at its middle for connection with a doubletree, to which the team is hitched to draw the machine over the ground to be prepared. In the front part of the frame A is arranged a roller C, journaled in suitable bearings in the sides of the frame A, and at the rear part of the frame is journaled a roller D, provided on its periphery with radial spikes E, adapted to pass into the ground to loosen the same.

Intermediate of the two rollers C and D is arranged a drag F, formed by a series of transversely-extending planks F', arranged in an inclined position and overlapping one another, as plainly shown in Fig. 3, the said planks extending forwardly and upwardly, as indicated, and with their ends fastened to side pieces $F^2$, connected by bolts $F^6$ to the sides of the frame A, the bolts extending through vertical slots A' in the frame sides to permit of raising or lowering the drag for the planks to work on the ground with more or less force, according to the nature of the ground. The drag F is also provided at its front end with a vertical end board $F^4$ to prevent dirt and stones from passing up into the drag, and a cross-board $A^2$, secured to the frame sides, closes the rear end of the drag. From the cross-board $A^2$ extends upwardly the front board of the housing H for partly inclosing the spiked roller D and for forming a seat for the driver. By the construction of the drag as described it is evident that stones or other weights can be readily loaded into the drag.

Now it will be seen that by raising or lowering the drag the latter can be brought more or less in contact with the ground to break up any clods on the surface of the ground left by the roller C, it being understood that when this machine is drawn over the ground the roller C rolls the ground and the drag F breaks up any clods contained in the ground and at the same time levels the latter. The spiked roller D rolls the ground a second time, and its spikes E by passing into the ground loosen the particles thereof to break the glazed surface of the ground, at the same time preparing the ground ready for the seed to be planted by the seeding-machine. It is understood that the spikes E in passing into the ground cut and crush all the clods under the surface of the ground, at the same time making the ground sufficiently loose, but thoroughly united, to receive the seeds. Downwardly-curved and longitudinally-extending cutters G are arranged under the spiked roller D, with the cutters extending between adjacent sets of spikes to assist in breaking the glazed surface of the ground and to prevent any clods, chunks, mud, or trash of any description from gathering in the spiked roller D. It will also be seen that stones or other weights may be placed in the drag to add weight enough to suit the hardness of the clods. Thus no matter how hard the clods are the drag can be raised and secured in place on the frame and weight added sufficient to crush the clods.

On the under side of the sides of the frame A are pivoted the rearwardly-extending runners I, normally resting against the lower edges of the frame sides, but adapted to be swung downward to lift the cutters and spikes off the ground when drawing the machine over a road to the field of operation, but principally to be lowered, so as to lift the side of the pulverizer when turning square around. For this purpose the rear free end of each runner I is pivotally connected by a link I' with a lever J, fulcrumed on the side of the frame A and adapted to be locked in a lowermost position by a catch K, fulcrumed on the front board of the housing H. Thus the runners I can be swung downward by swinging the levers J downward and then locking the same in place by the catches K.

Having thus described my invention, I claim as new and desire to secure by Letters Patent—

1. A pulverizer comprising a main frame, a front roller journaled in the said frame, a rear spiked roller journaled in the said frame, a drag intermediate of the said rollers, cutters extending down under the spike-roller between the spikes thereof and runners movable on the said frame and adapted to lift the rear end of the frame to bring and hold the spiked roller and drag above the ground, substantially as shown and described.

2. A pulverizer, comprising a main frame, a roller journaled in the front end of the said frame, a spiked roller in the rear end of the said frame, a drag intermediate of the said rollers and consisting of sides and a series of transversely-extending planks fastened at their ends to the said sides, the drag being adjustably secured to the said main frame and the said planks being inclined upwardly and forwardly and overlapping one another, runners carried by the main frame for raising and holding the spiked roller and drag above the ground, and downwardly-curved cutters fixed to the frame and extending downwardly under the spiked roller between the spikes thereof, substantially as shown and described.

3. In a pulverizer, the combination with a frame, a roller mounted at each end of the frame, and a drag intermediate of the rollers, of rearwardly-extending runners having their forward ends hinged to the frame, pivoted levers, and links connecting the levers with the rear free ends of the runners, substantially as described.

4. In a pulverizer, the combination with a frame having slotted sides, and a roller mounted at each end of the frame, of a drag, comprising side pieces, a front board and transversely-extending planks having their ends secured to the side pieces, said planks being inclined upwardly and forwardly and overlapping one another, and bolts secured to the side pieces of the drag and extending through the slots of the frame, substantially as described.

5. A pulverizer, comprising a frame, a roller in the front end of the frame, a spike-roller in the rear end of the frame, a drag intermediate of the rollers and formed of planks inclined upwardly and forwardly and overlapping one another, cutters fixed to the frame and extending down under the spiked roller between the spikes thereof, rearwardly-extending runners hinged at their forward ends to the frame, and means for raising said runners and holding them elevated, substantially as described.

JAMES W. RIGG.

Witnesses:
LINCOLN J. RIGG,
ELDO BLEDSOE.